United States Patent
Sodhani et al.

(10) Patent No.: US 10,915,701 B2
(45) Date of Patent: Feb. 9, 2021

(54) CAPTION ASSOCIATION TECHNIQUES

(71) Applicant: Adobe Inc., San Jose, CA (US)

(72) Inventors: Shagun Sodhani, Delhi (IN); Kartikay Garg, Chandigarh (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/925,059

(22) Filed: Mar. 19, 2018

(65) Prior Publication Data

US 2019/0286691 A1 Sep. 19, 2019

(51) Int. Cl.
*G06F 17/24* (2006.01)
*G06F 40/174* (2020.01)
*G06N 3/08* (2006.01)
*G06F 16/33* (2019.01)

(52) U.S. Cl.
CPC ........ *G06F 40/174* (2020.01); *G06F 16/3347* (2019.01); *G06N 3/08* (2013.01)

(58) Field of Classification Search
CPC .... G06F 17/243; G06F 16/93; G06F 16/5846; G06F 17/2785; G06F 40/174; G06F 16/3347; G06F 3/08; G06K 9/00463; G06K 2209/01; G06K 9/00449; G06K 9/00456; G06K 9/00469; G06N 20/00; G06N 3/08
See application file for complete search history.

(56) References Cited

U.S. PATENT DOCUMENTS

| | | | | |
|---|---|---|---|---|
| 7,779,355 B1* | 8/2010 | Erol | ........ | G06F 16/5846 715/273 |
| 7,965,891 B2* | 6/2011 | Handley | ........ | G06K 9/00469 382/173 |
| 8,233,714 B2* | 7/2012 | Zuev | ........ | G06K 9/00469 382/180 |
| 9,535,882 B2* | 1/2017 | Craven | ........ | G06F 17/24 |
| 2007/0143272 A1* | 6/2007 | Kobayashi | ........ | G06F 16/583 |

(Continued)

OTHER PUBLICATIONS

"IBM Datacap insight Edition", Retrieved at: http://www-01.ibm.com/common/ssi/cgi-bin/ssialias?subtype=SP&infotype=PM&htmlfid=IMS14489USEN&a—on Dec. 5, 2018, Jun. 2018, 6 pages.

(Continued)

*Primary Examiner* — Wilson W Tsui
(74) *Attorney, Agent, or Firm* — Fig. 1 Patents (57) ABSTRACT

Caption association techniques as part of digital content creation by a computing device are described. The computing device is configured to extract text features and bounding boxes from an input document. These text features and bounding boxes are processed to reduce a number of possible search spaces. The processing may involve generating and utilizing a language model that captures the semantic meaning of the text features to identify and filter static text, and may involve identifying and filtering inline captions. A number of bounding boxes are identified for a potential caption. The potential caption and corresponding identified bounding boxes are concatenated into a vector. The concatenated vector is used to identify relationships among the bounding boxes to determine a single bounding box associated with the caption. The determined association is utilized to generate an output digital document that includes a structured association between the caption and a data entry field.

20 Claims, 8 Drawing Sheets

(56) References Cited

U.S. PATENT DOCUMENTS

| | | | |
|---|---|---|---|
| 2008/0005667 A1 | 1/2008 | Dias et al. | |
| 2009/0067729 A1* | 3/2009 | Turkelson | G06K 9/2054 382/224 |
| 2010/0128922 A1* | 5/2010 | Navon | G06K 9/00449 382/100 |
| 2015/0129653 A1* | 5/2015 | Gupta | G06Q 10/10 235/375 |
| 2016/0132495 A1 | 5/2016 | Ghatage et al. | |
| 2016/0217119 A1* | 7/2016 | Dakin | G06F 17/243 |
| 2017/0046324 A1* | 2/2017 | Hu | G06F 16/5846 |
| 2017/0046622 A1* | 2/2017 | Gaither | G06F 17/2795 |
| 2017/0075873 A1* | 3/2017 | Shetty | G06F 17/243 |
| 2017/0132866 A1* | 5/2017 | Kuklinski | G07D 7/20 |
| 2017/0286415 A1* | 10/2017 | Kumar | G06K 9/00456 |
| 2018/0033147 A1* | 2/2018 | Becker | G06K 9/00442 |
| 2019/0258854 A1 | 8/2019 | Hosabettu et al. | |
| 2020/0285878 A1 | 9/2020 | Wang et al. | |
| 2020/0302016 A1 | 9/2020 | Aggarwal et al. | |

OTHER PUBLICATIONS

"Understanding LSTM Networks", Retrieved at: http://colah.github.io/posts/2015-08-Understanding-LSTMs/, Aug. 27, 2015, 8 pages.

Joulin,"Bag of Tricks for Efficient Text Classification", Aug. 9, 2016, 5 pages.

Li,"Classification of Text Documents", The Computer Journal, vol. 41, No. 8, 1998, Jan. 1998, pp. 537-546.

Luong,"Effective Approaches to Attention-based Neural Machine Translation", Sep. 20, 2015, 11 pages.

Manevitz,"One-Class SVMs for Document Classification", Journal of Machine Learning Research 2, Dec. 2001, pp. 139-154.

Schuster,"Bidirectional Recurrent Neural Networks", IEEE Transactions on Signal Processing, vol. 45, No. 11, Nov. 1997, 10 pages.

"IBM Datacap Mobile Product Demo", Retrieved at: https://www.youtube.com/watch?v=TMwAam0TMkQ, Mar. 1, 2016, 2 pages.

"IBM Datacap Insight Edition", Retrieved at: http://www-01.ibm.com/common/ssi/cgi-bin/ssialias?subtype=SP&infotype=PM&htmlfid=IMS14489USEN&a—on Sep. 25, 2017, 4 pages.

"TensorFlow", Retrieved at: https://www.tensorflow.org/—on Sep. 25, 2017, 4 pages.

Karapathy,"The Unreasonable Effectiveness of Recurrent Neural Networks", Andrej Karapathy Blog—Retrieved at: http://karpathy.github.io/2015/05/21/rnn-effectiveness/, May 21, 2015, 30 pages.

Olah,"Understanding LSTM Networks", Retrieved at: http://colah.github.io/posts/2015-08-Understanding-LSTMs/, Aug. 27, 2015, 8 pages.

"Pre-Interview First Office Action", U.S. Appl. No. 16/359,402, dated Nov. 27, 2020, 6 pages.

* cited by examiner

CAPTION ASSOCIATION TECHNIQUES

BACKGROUND

It is becoming increasingly more common for forms to be filled out electronically through interaction with a computing device rather than filling out a paper form with pen or pencil. When a new digital form is created, for instance, an author often includes information pertaining to a structure of the digital form such as by providing mechanisms through which to interact with the digital form and by indicating regions in which particular input fields are to be displayed. However, multitudes of forms exist that do not include any digital structure. For instance, if a paper form is scanned into a digital format, the scan will merely include an image version of the document. Manually re-creating these forms in a structured digital format is time consuming, tedious, and undesirable for users.

Conventional techniques for associating structure by a computing device with an unstructured form use rules that fail when an input form has a structure that was not considered when developing the rules. For instance, some conventional techniques rely on an assumption that captions are always located to the left of an associated blank space or entry field in which to enter a response. These techniques simply fail for any form that includes a single caption that is not located to the left of its associated entry field. As another example, some conventional techniques rely upon comparisons to curated templates by searching for a digital template that has a same or similar structure to an input form; however, such techniques simply fail whenever an input form does not correspond to an existing curated digital template. Accordingly, conventional techniques for associating structure by a computing device with an unstructured form fail on inputs having a document structure that was not considered when developing the rules. This is a problem particular to digital forms that does not exist in relation to traditional, non-digital forms. For instance, a human viewing a paper form has the ability to deduce or infer a structure of the form and may interact with that structure through convention means such as by writing on it with a pencil. In contrast, when a user views a digital form displayed on a display device the user cannot interact with the form based on the user's inferences, and the user remains restricted by the digital structure of the form.

SUMMARY

Caption association techniques as part of digital content creation by a computing device are described. These techniques are usable by a computing device to generate structured digital forms from unstructured documents such as image scans of paper documents. While a human interacting with a paper form has freedom to write on the paper wherever they want, the same human is limited and restricted to interact with a digital form only in a manner specified by the structure of the digital form. Thus, a human can interact with paper forms by utilizing their own inferences or experiences, but cannot impart their knowledge into interactions with digital forms. While it may be a simple task for a human to visually identify a structure of a document, it is a difficult task for a computing device to extract the structure of the document without the benefit of human inference. Conventional techniques to extract structure from a document rely upon rules-based approaches that are hindered and fail whenever an input document has a format that was not previously considered when developing the rules, wasting computing resources and causing user frustration and inaccurate results. Accordingly, caption association techniques are described that are employed by a computing device as part of digital content creation. These techniques support conversions without relying on pre-established rules or assumptions, and thus do not suffer from limitations of rule-based conventional techniques.

The computing device, for instance, may extract text features and bounding boxes from an input document. Each text feature is initially a potential caption, and each bounding box is a potential data entry field associated with a caption. However, many input documents include text features that are not captions or may include captions that are not associated with separate data entry fields. The text features and bounding boxes are processed to remove such text features from further consideration and reduce a number of possible associations and search spaces, thereby conserving resources and increasing the efficiency of the computing device. The processing may involve generating and utilizing a language model that captures the semantic meaning of the text features to identify and filter static texts that are not captions, and may additionally involve identifying and filtering inline captions that do not have a separate data entry field outside of the caption.

Further, a number of bounding boxes are identified by the computing device for each potential caption. Each respective potential caption and corresponding set of bounding boxes is concatenated into a single vector. The concatenated vectors are used to identify relationships among the bounding boxes to determine a single respective bounding box associated with each caption. These determined associations are then utilized to generate an output digital document that includes structured associations between captions and data entry fields for display on a display device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

One of the challenges of a computing device to create structured digital forms through conversion of an unstructured digital document (e.g., a scan of a paper document) is to ensure accurate identification of structure in instances in which the structure was not considered when developing rules controlling the conversion. In one such example, conventional techniques often fail when confronted with new document structures. This is because rules-based conversion techniques rely on assumptions that are crafted based on existing identified structures. Conventional techniques used to convert forms into a structured digital format, for instance, assume that captions are always located to the left of an associated blank space or entry field in which to enter a response. Thus, conventional techniques are hindered and fail whenever an input document has a format that was not previously considered when developing the rules or assumptions, wasting computing resources and causing user frustration and inaccurate results.

Accordingly, caption association techniques are described that are employed by a computing device as part of digital content creation. These techniques support conversions without relying on pre-established rules or assumptions, and thus do not suffer from limitations of rule-based conventional techniques. To do so, a language model training system of a computing device creates a language model to convert input text into text vectors that capture semantic meaning of the input text. In one example, the language model is created by the language model training system based on a large arbitrary text corpus. The text corpus is of a much greater scope than expected input documents, and thus the language model is unlikely to encounter unknown vocabulary when processing the input documents. To better react to errors introduced due to practical limitations of image conversion techniques, a number of mutations are added to the text corpus prior to processing by the language model training system. The language model training system may use machine learning techniques to generate the language model, and once generated the language model is capable of generating vector representations of text sequences that capture semantic meaning.

An input document is then analyzed by a feature extraction system to transform the data of the input document into digital bounding boxes and text features, such as through use of optical character recognition techniques. Text features in a form are often accompanied by a space in which to provide information. For example, a text feature in a paper form is often proximate to an empty space in which a user can enter information by writing in the space with a pen or pencil. These empty spaces are referred to as "widgets". Widgets on a paper form are straightforward and allow a user to interact using any writing implement. However, a user can only interact with widgets in a digital form if the widgets have a digital structure allowing the user to digitally interact with them. For example, although a scan of a paper form will include a number of widgets, a user cannot interact with those widgets unless additional structure is provided. Examples of interactive widgets include interactive text fields, interactive toggles, interactive check-boxes, drop-down menus, and so forth.

The text features are input to the language model, and vector representations of the text features are returned by the feature extraction system. The semantic meaning within the vector representations is leveraged by the feature extraction system to filter out text features that are not associated with data entry fields or widgets, such as static text features or in-line captions. For instance, the semantic meaning within the vector representations is utilized to identify text features that are static and are not associated with any widgets, such as instructions. Further, the identified bounding boxes are compared to identify any text features that are inline captions, for which a widget is included within the caption itself and additional widgets do not need to be identified. These preprocessing steps of removing static text features and inline captions reduce the dataset utilized for further association processing, thereby conserving resources and increasing the efficiency of the computing device.

Text features that are likely to be associated with a widget are compared by the system to the identified bounding boxes to create caption-widget associations. To further increase the efficiency of the computing device, the number of possible associations and search spaces is further reduced. For instance, a directional neighborhood search is performed by the system for each text feature to identify a small subset of bounding boxes that are most likely to be associated with the respective text feature. In this way, a reduced number of bounding boxes are processed for each text feature and the computational resources required by the system is drastically reduced. Each respective text feature and corresponding subset of bounding boxes is concatenated into a single vector. The concatenated vectors are used to identify relationships among the bounding boxes to determine a single respective bounding box associated with each caption. These determined associations are then utilized to generate an output digital document that includes structured caption-widget associations. These techniques may be performed automatically and without user intervention.

In the following discussion, an example environment is described that may employ the techniques described herein. Example procedures are described which may be performed in the example environment as well as other environments. Consequently, performance of the example procedures is not limited to the example environment and the example environment is not limited to performance of the example procedures.

Terminology Examples

Example descriptions of explanations of certain terms as used herein are set forth below. Each term is applicable to one or more, but not necessarily all, implementations that are presented herein. Some terms are further described using one or more examples.

"Caption" refers to a text field that provides a description for another field. For instance, a caption may provide a description of the type of information that is to be entered in an associated widget. Example captions include "Name" and "Date of Birth".

"Widget" refers to a space in which to provide information. For example, a widget in a paper form is typically presented as an empty space in which a user can enter information by writing in the widget with a pen or pencil. However, a widget can take any number of forms and is not limited to empty spaces configured for handwriting. For instance, another example of a widget is a check box. In this example, the information entered in the widget may simply convey that an associated caption is true or false, and so forth.

"Interactive widget" refers to a widget that has digital structure allowing a user to digitally interact with the widget. For example, although a scan of a paper form will include a number of widgets, a user cannot interact with those widgets unless additional structure is provided. Examples of interactive widgets include interactive digital text fields, interactive digital toggles, interactive digital check-boxes, digital drop-down menus, and so forth.

"Machine learning" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, etc. Thus, a machine-learning model makes high-level abstractions in data by generating data-driven predictions or decisions from the known input data.

Example Environment

Figure 1:
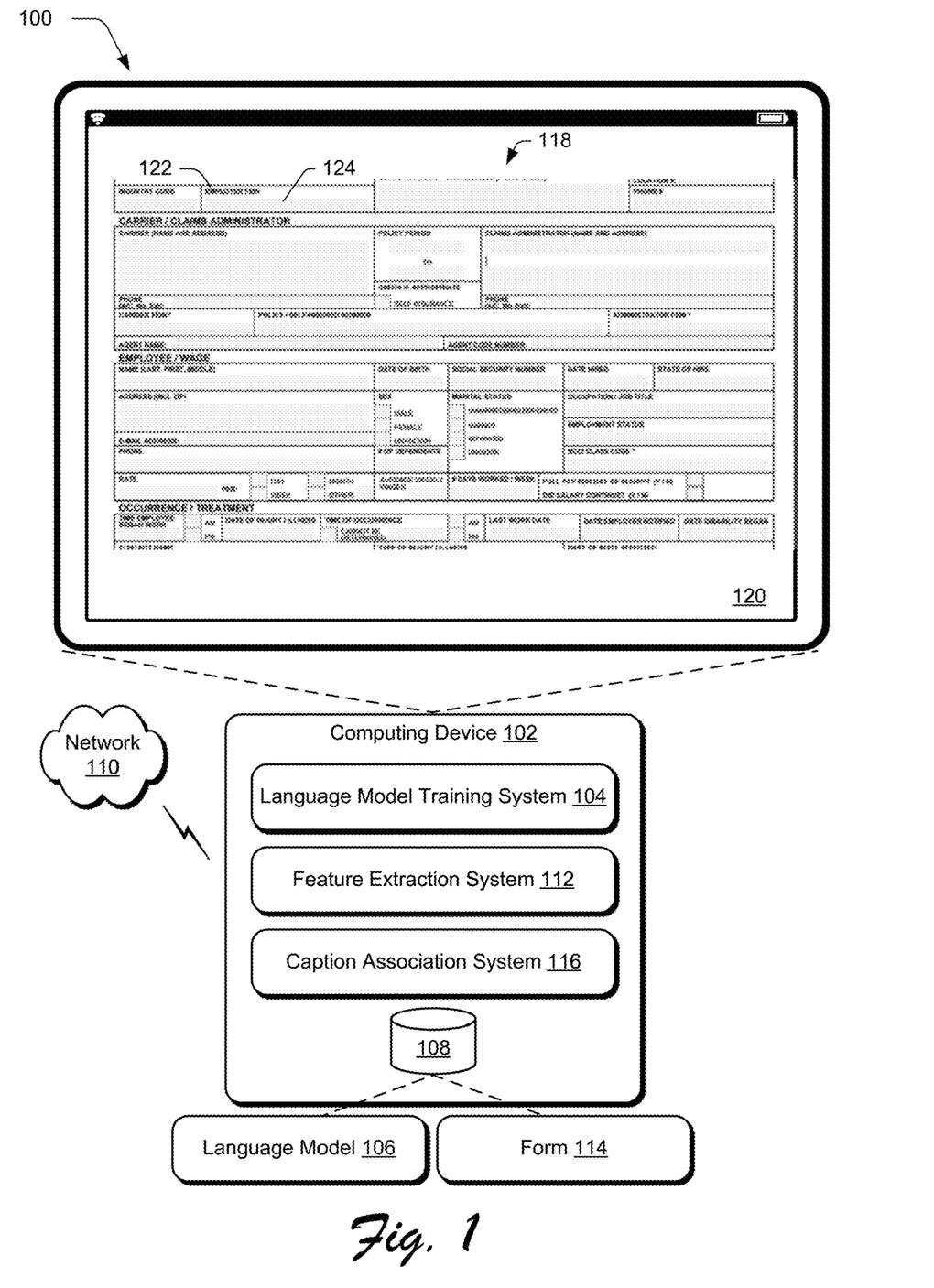
FIG. 1 is an illustration of an environment in an example implementation that is operable to employ caption association techniques as described herein.

FIG. 1 is an illustration of a digital medium environment 100 in an example implementation that is operable to employ caption association techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 8.

The computing device 102 is illustrated as including a language model training system 104. The language model training system 104 is implemented at least partially in hardware of the computing device 102 to process textual data to create a language model 106, which is illustrated as maintained in a storage device 108 of the computing device 102. Such processing includes introducing mutations into an arbitrary text corpus to create the language model 106 capable of generating vector representations of text sequences as described in greater detail with respect to FIG. 2. Although illustrated as implemented locally at the computing device 102, functionality of the language model training system 104 may also be implemented in whole or in part via functionality available via the network 110, such as part of a web service or "in the cloud." For instance, the language model training system 104 may be located on a separate device that transmits the language model 106 to the computing device 102 via the network 110.

The computing device 102 is further illustrated as including a feature extraction system 112. The feature extraction system 112 is implemented at least partially in hardware of the computing device 102 to process data of an input file and transform the data into digital bounding boxes and text features, as described in greater detail with respect to FIG. 3. The input file may take a variety of forms, including a digital image of a form 114. In one example the form 114 is a digital scan of a paper document, and may be stored according to a variety of formats such as a PDF file, a JPEG file, a GIF file, a TIF file, a PNG file, and so forth. The form 114 includes a number of captions that are associated with widgets, however the form 114 does not include digital information pertaining to these associations and may be 'blind' with respect to which portions of the form are captions or widgets. Although illustrated as implemented locally at the computing device 102, functionality of the feature extraction system 112 may also be implemented in whole or in part via functionality available via the network 110, such as part of a web service or "in the cloud."

The computing device 102 further includes a caption association system 116. The caption association system 116 is implemented at least partially in hardware of the computing device 102 to process input text features and bounding boxes and transform them into caption-widget associations that may be leveraged to create a digital document 118. Such processing includes detecting text features that correspond to captions and associating each caption with a widget based on the bounding boxes as described in greater detail with respect to FIGS. 4 and 5. Although illustrated as implemented locally at the computing device 102, functionality of the caption association system 116 may also be implemented in whole or in part via functionality available via the network 110, such as part of a web service or "in the cloud."

The digital document 118 may be stored in the storage device 108 and/or configured for output, e.g. by a display device 120 of the computing device 102. The digital document 118 includes at least one caption 122 that is associated with an interactive widget 124. The caption 122 and the interactive widget 124 may take a variety of forms. For example, as illustrated in FIG. 1 the interactive widget 124 is an interactive or editable text field that is located relative to the caption 122 according to a structure of the input form 114. However, the interactive widget 124 can take any number of forms, such as an interactive toggle, a drop-down menu, and so forth. The digital association between the caption 122 and the interactive widget 124 allows for structures or formats that do not correspond to the initial input form 114. This may allow for various digital documents 118 to be created for a single form 114, such as digital documents formatted for consumption on user devices with differing capabilities. As an example, while an input form may include a caption and widget to enter a 'name' and a neighboring caption and widget to enter a 'date of birth', a digital document 118 that is generated for consumption on a mobile device may include multiple interactive pages such as a first page with a widget to enter a 'name', a second page with a widget to enter a 'date of birth', and so on. As another example, a generated digital document 118 may be a reflowable form that adjusts its structure based on an available display area or a refillable form that can be digitally reused multiple times.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
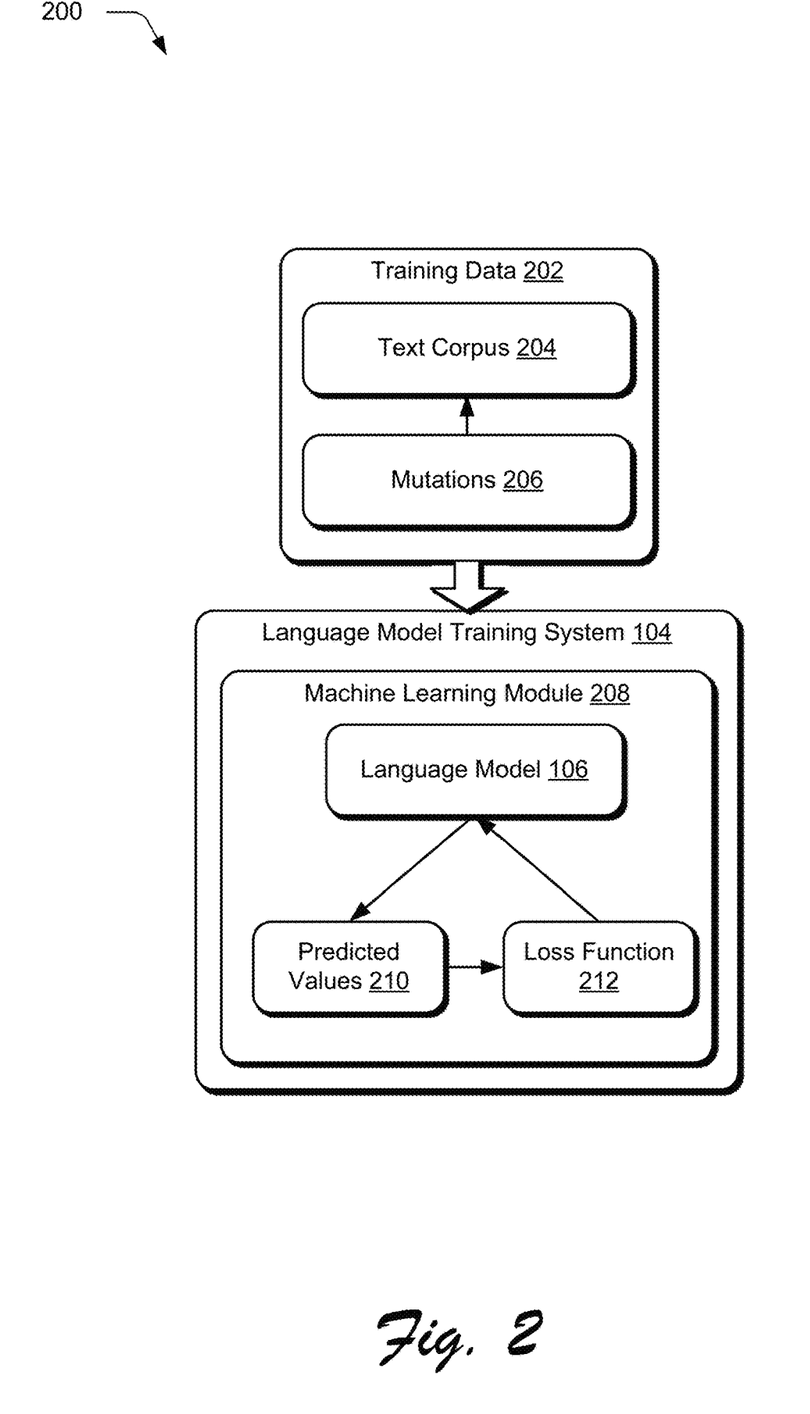
FIG. 2 depicts an example system showing a language model processing pipeline of the language model training system of FIG. 1 in greater detail.

FIG. 2 depicts a system 200 showing an example language model processing pipeline of the language model training system 104 of FIG. 1 in greater detail to create the language model 106. The language model processing pipeline begins with creation of training data 202. The training data 202 is created by retrieving a text corpus 204, such as via the network 110, and introducing mutations 206 to the text corpus 204. The text corpus 204 may be any large collection of text, for example a collection of text from the website Wikipedia®, the website Reddit®, and so forth. The text corpus 204 is modified to introduce the mutations 206 that simulate mistakes that occur during Optical Character Recognition (OCR). For instance, the mutations 206 may include adding extra spaces, confusing characters with each other (e.g., replacing 'i' with '1'), removing the last character from a word, introducing a space in the middle of a word, and so forth.

The training data 202 is input to the language model training system 104 to create the language model 106. In order to do so, the language model training system 104 employs a machine learning module 208 that is configured to process the training data 202. The machine learning module 208 may, for instance, train the language model 106 using the training data 202 as training data on a character by character basis. By analyzing features of the input text (e.g., at various levels of abstraction or depths within levels of a neural network) the language model 106 can predict the next character of an input based on previous characters of the input. The language model 106 when provided with the training data 202 as an input thus creates predicted values 210 for characters within the training data 202. To verify the accuracy of the predicted values 210, the machine learning module 208 compares the predicted values 210 with the correct values in the training data 202.

For instance, the machine learning module 208 can determine the differences between the predicted values 210 and the actual values by utilizing a loss function 212 to determine a measure of loss (i.e., a measure of difference such as a mean square error or mean absolute loss). For example, the loss function 212 can determine a measure of loss for each character between the predicted character and the actual character, can determine a measure of loss for each word between the predicted word and the actual word, and so forth. The machine learning module 208 uses the loss function 212 (e.g., uses the measure of loss resulting from the loss function 212) to train the language model 106. In particular, the machine learning module 208 can utilize the loss function 212 to correct parameters or weights that resulted in incorrect predicted values. The machine learning module 208 can use the loss function 212 to modify one or more functions or parameters, such as to modify one or more functions or parameters in its prediction algorithms to minimize the loss function 212 and reduce the differences between the predicted values 210 and the correct values in the training data 202. In this way, the machine learning module 208 may employ the loss function 212 to learn the language model 106 through processing of the training data 202. Once trained, the language model 106 may then be used in this instance to transform text sequences into vector representations.

As described above, the machine learning module 208 can train the language model 106 using training texts such as the text corpus 204. The language model training system 104 can use any type of machine-learning techniques capable of predicting characters in text. According to various implementations, the language model training system 104 uses supervised learning, unsupervised learning, or reinforcement learning. For example, the machine learning module 208 can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. In any case, the language model training system 104 uses machine-learning techniques to continually train and update the language model 106 to produce accurate predictions of the next character in a text sequence.

As the language model 106 is trained based on the large text corpus 204, the language model 106 is unlikely to encounter unknown or new words within the form 114. In embodiments, the text corpus 204 is a large general text corpus that is not curated particularly based on forms or language expected to be found in forms. For example, the large general text corpus may be a collection of text from the website Wikipedia®, the website Reddit®, and so forth. By utilizing a general text corpus that is not particular to forms, the language model 106 is robust. In some embodiments, the text corpus 204 does not include the form 114. In this manner, the language model 106 is not dependent on or biased to a particular structure of forms, and can accurately process the form 114 even if the form 114 utilizes a structure that was not considered when training the language model 106. Thus, the text corpus 204 does not directly include text extracted or directly drawn from the form 114, and instead contains a general vocabulary that provides robust semantic meaning that can be applied to the text directed extracted from the form 114. However, when the language model 106 is created specifically for use with forms such as form 114, the language model 106 may be further fine-tuned based on data from a text corpus that includes only forms. This fine-tuning increases the accuracy of results when the input is a form, but retains the robust vocabulary and flexibility gained from the large text corpus 204. Additionally, multiple or alternative language models 106 may be created. For example, additional language models 106 may be created for different languages. This may be achieved simply by training a new language model 106 utilizing a different text corpus 204 in a different language.

Figure 3:
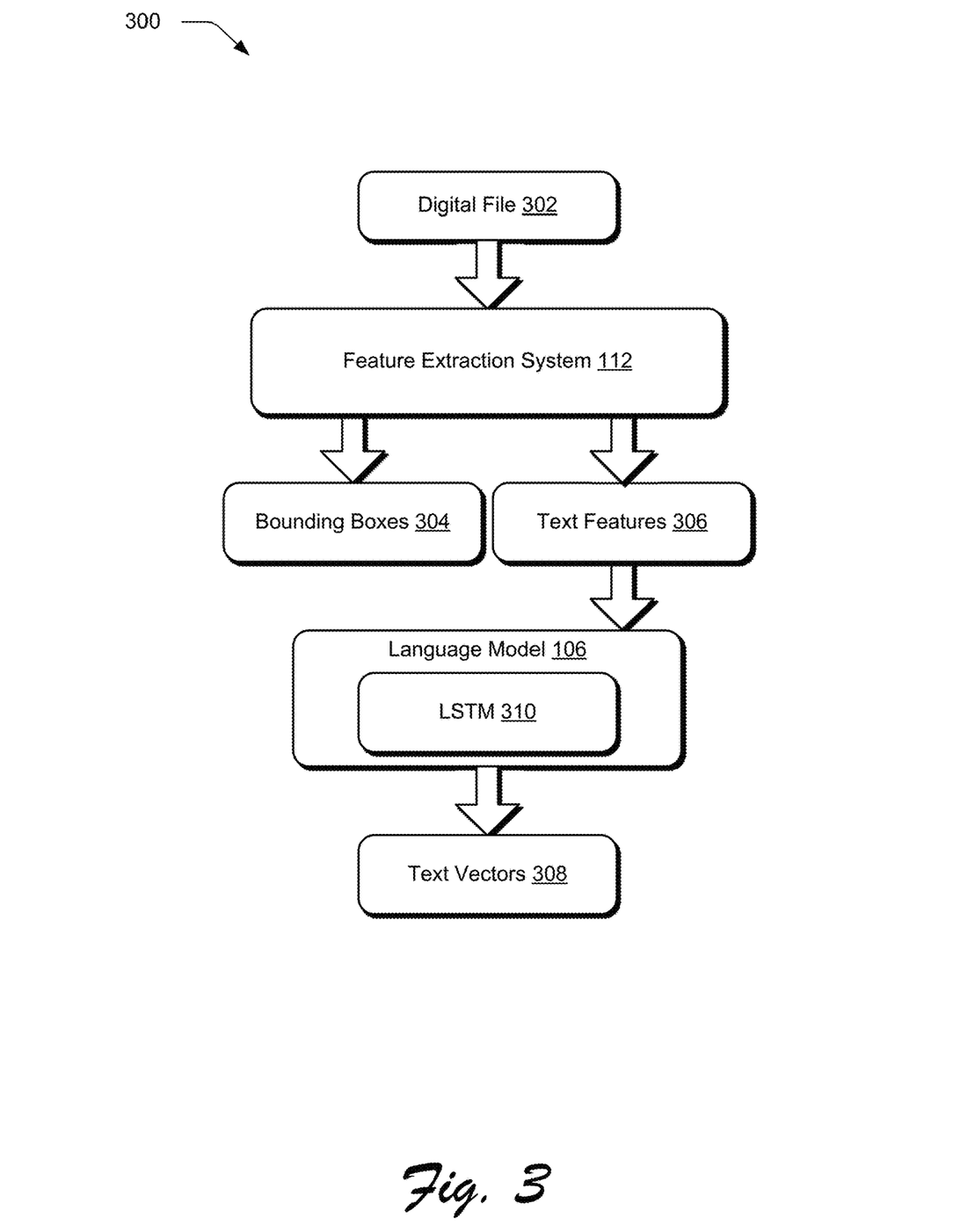
FIG. 3 depicts an example system showing a feature extraction processing pipeline of the feature extraction system of FIG. 1 in greater detail.

FIG. 3 depicts a system 300 showing an example feature extraction processing pipeline of the feature extraction system 112 of FIG. 1 in greater detail. The feature extraction processing pipeline begins with an input digital file 302 becoming processed by the feature extraction system 112 of the computing device 102. Although the digital file 302 as viewed by a user may portray a number of structural elements, for instance headers, captions, widgets, instructions, company branding, and so forth, the data of the digital file 302 fails to distinguish between the different elements. Accordingly, the feature extraction system 112 analyzes the input digital file 302 (for instance, a PDF file or JPEG image) to identify bounding boxes 304 and text features 306 visible in the 'image' of the digital file 302. The bounding boxes 304 may include bounding boxes associated with various features of the digital file 302 such as bounding boxes based on identified lines, bounding boxes corresponding to the text features 306, bounding boxes corresponding to 'empty' spaces, bounding boxes corresponding to widgets, and so forth.

The text features 306 are initially stored, for example, according to ASCII values. The text features 306 are then processed by the language model 106 to generate text vectors 308. The text vectors 308 are vector representations of the text features 306 that capture semantic meaning of the text features 306. For example, a single text vector 308 may be a vector with one thousand or more dimensions, thereby capable of including significantly more information than is included in the raw ASCII values corresponding to the text features.

In some implementations the language model 106 incorporates a trained Long Short-Term Memory (LSTM) 310 recurrent neural network. The cell of the LSTM 310 has two internal states, a cell state and a hidden state. The hidden state is used as a memory that can be passed to a following time-step and used to compute what the cell will forget, input, and output in the following time-step. When a text sequence has been input into the language model 106, the hidden state of the LSTM 310 at the end of the text sequence is used as the text vector 308 for the text sequence. After a text vector 308 for a text sequence is generated, the internal states of the LSTM 310 may be reset. For instance, text features corresponding to different fields of the form 114 are input into the LSTM 310 separately with the internal state of the LSTM 310 reset between the input from each field to generate independent vector representations.

Figure 4:
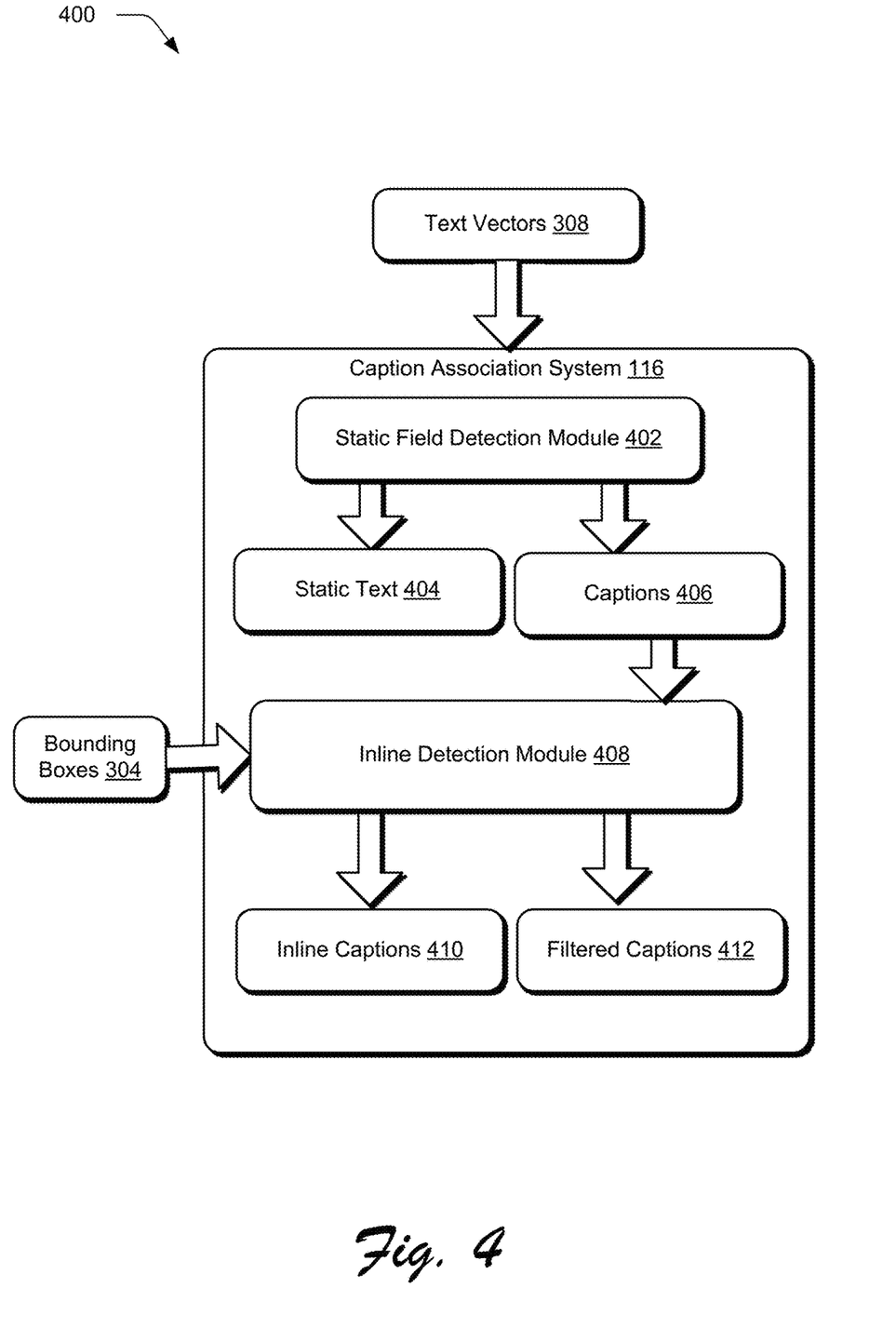
FIG. 4 depicts an example system showing a caption association processing pipeline of the caption association system of FIG. 1 in greater detail.

FIG. 4 depicts a system 400 showing an example caption association processing pipeline of the caption association system 116 of FIG. 1 in greater detail. The caption association processing pipeline begins with input text vectors 308 becoming processed by the caption association system 116 of the computing device 102. The text vectors 308 are processed by a static field detection module 402 to identify static text 404 and captions 406. The static text 404 includes text features that are not associated with widgets, for example section headers, titles, footers, instructions, and so forth. Spatial features associated with text features may vary arbitrarily among forms or even within a single form, so the static field detection module 402 considers the semantic meaning of text features in a determination whether a text feature is static text 404 or a caption 406. This semantic meaning is found in the associated text vector 308. As an example, the text vector 308 is input into a neural network with multiple fully connected layers that can establish semantic meaning of the text vector 308 and feed the semantic meaning into a binary classifier to determine whether the text vector 308 is static text 404 or a caption 406.

The captions 406 are then input to an inline detection module 408 along with the bounding boxes 304. An inline caption is a caption that wholly encompasses its associated widget. For instance, a caption may read "My name is _____ and my date of birth is _____." In this example, the widgets to enter a name and a date of birth are located within the caption itself and the caption is considered an inline caption. The inline detection module 408 locates a bounding box for the caption 406 and at least one bounding box for a widget associated with the caption 406. The located bounding boxes for the caption and widget are compared, and a caption is considered an inline caption 410 when the bounding box for the widget exceeds a threshold overlap with the caption bounding box. In some implementations, the threshold is less than 100% to account for jitter introduced in the detection of the bounding boxes, such as a threshold of 75% overlap. Captions 406 that are not inline captions 410 are output as filtered captions 412.

Figure 5:
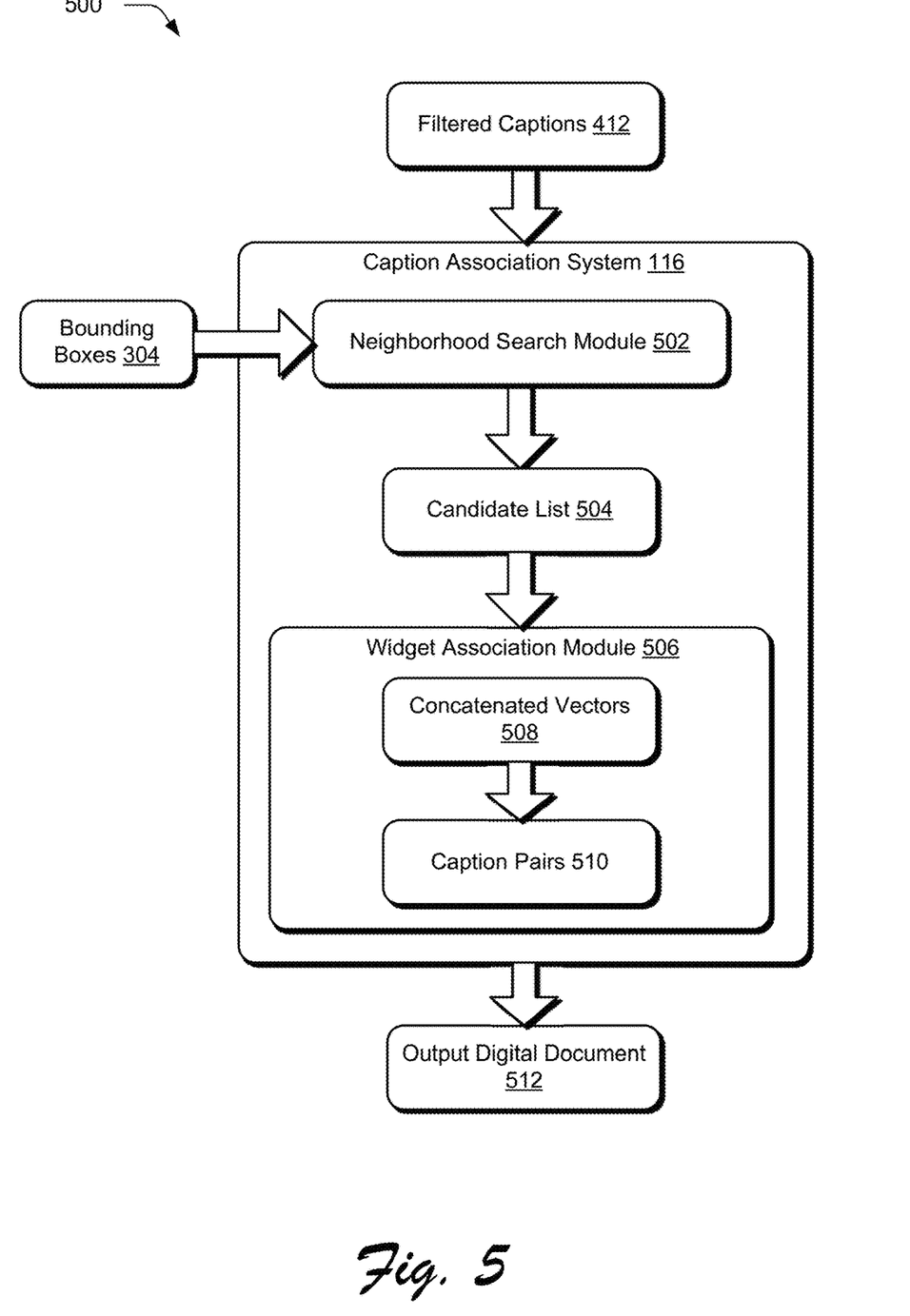
FIG. 5 depicts an example system showing a caption association processing pipeline of the caption association system of FIG. 1 in greater detail.

FIG. 5 depicts a system 500 showing an example caption association processing pipeline of the caption association system 116 of FIG. 1 in greater detail, and in some implementations is an extension of the system 400 of FIG. 4. The caption association system 116 limits the possible combinations of the filtered captions 412 and the bounding boxes 304 in order to reduce the computational complexity of associating captions with widgets. To do so, the filtered captions 412 are input to a neighborhood search module 502 of the caption association system 116 along with the bounding boxes 304. The neighborhood search module 502 performs a neighborhood search around each of the filtered captions 412 to find candidate bounding boxes that can be logically associated with each of the filtered captions 412. The neighborhood search includes running a directional neighbor search for each of the filtered captions 412 over all of the bounding boxes in the form and selects a number of nearby widgets in each direction (e.g., in a right direction from the filtered caption, a left direction from the filtered caption, an up direction from the filtered caption, and a down direction from the filtered caption). It has been found that selecting two nearest widgets in each direction maintains a greater than 99% recall rate while greatly simplifying the computational expense and complexity of following steps. For instance, by limiting possible bounding boxes for a filtered caption to two in each direction, only eight bounding boxes have to be analyzed compared to possibly hundreds of unfiltered bounding boxes. This filtered list of possible bounding boxes for each respective filtered caption 412 is output as a candidate list 504.

The candidate list 504 is input to a widget association module 506. The widget association module 506 concatenates or combines all information for a particular caption in the candidate list 504 into a single vector representation 508. This information includes the corresponding text vector 308, a bounding box containing the corresponding text features 306, and the corresponding bounding boxes within the candidate list 504. The concatenated vectors 508 are input into a neural network with multiple fully connected layers that can identify relationships among the bounding boxes and feed the relationships into a softmax classifier to determine a single one of bounding boxes 304 that is associated with a caption 412. The determined associations between the captions 412 and the bounding boxes 304 are stored as caption pairs 510.

In some implementations, the neural network utilized by the widget association module 506 is trained with supervised learning. In such implementations, a guiding signal for the supervised learning may be generated by considering a bounding box that is nearest to the caption and that is also associated with the caption in the candidate list 504 as being the correct output for the training example.

The caption association system 116 may generate an output digital document 512 that incorporates the caption pairs 510. Each caption-widget pair of the caption pairs 510 may take a variety of forms. For instance, each respective caption-widget pair may be one of an interactive text field, an interactive toggle, a drop-down menu, and so forth. The associated caption pairs 510 allow for output digital documents 512 to be created according to various structures or formats, or to create multiple output digital documents 512.

For instance, a first output digital document 512 may be created as a reflowable form that corresponds to the format of a corresponding input form, while a second output digital document 512 may be created as a series of prompts tailored for use on mobile devices with small display areas.

Example Procedures

The following discussion describes techniques that may be implemented utilizing the previously described systems and devices. Aspects of the procedures may be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-5.

Figure 6:
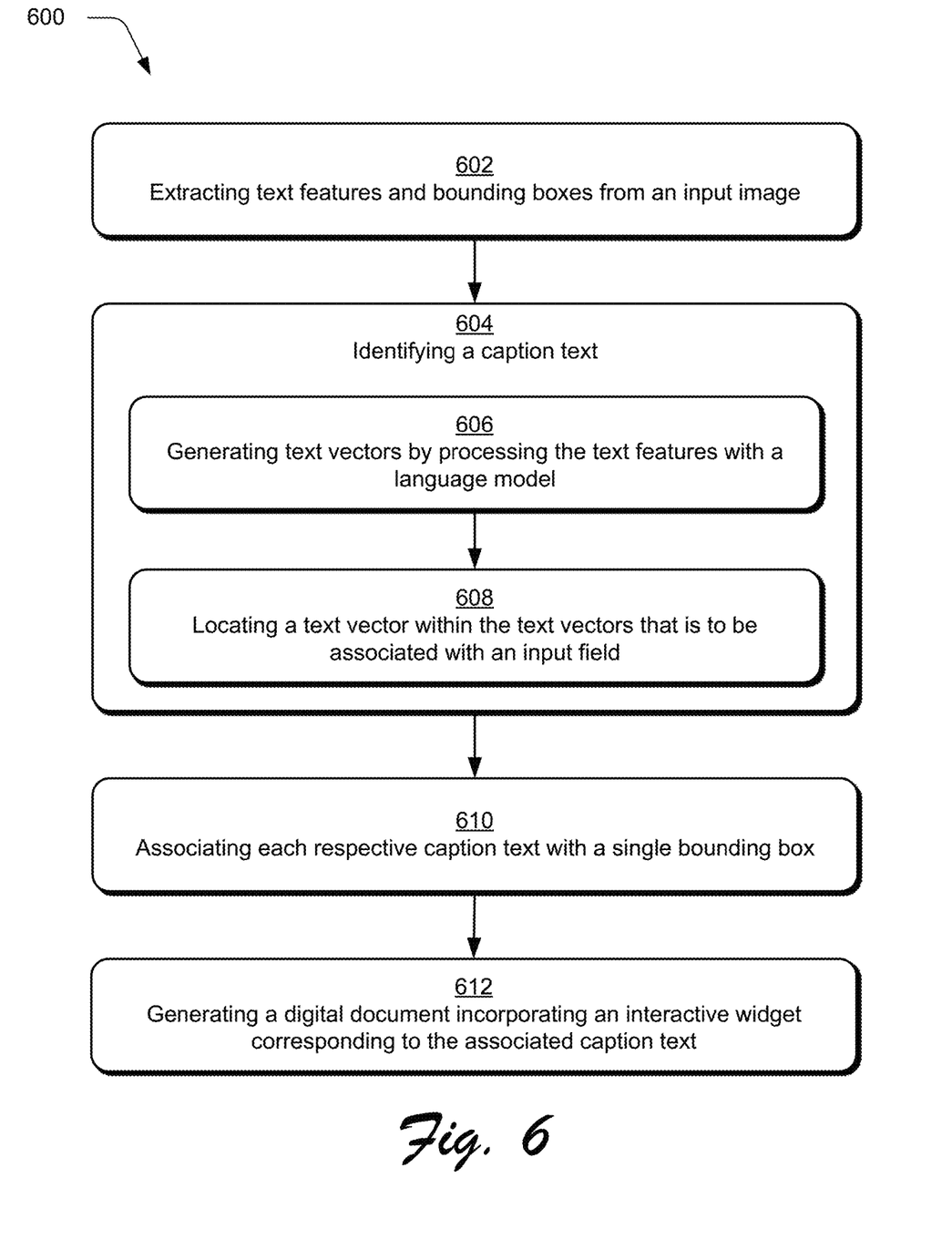
FIG. 6 is a flow diagram depicting a procedure in an example implementation of caption association for an input image.

FIG. 6 depicts a procedure 600 in an example implementation of caption association for an input image. Text features and bounding boxes are extracted from an input image (block 602). This may involve, for instance, utilizing OCR or other techniques as described above. A caption text is identified (block 604). This includes generating text vectors by processing the text features with a language model (block 606), and locating a text vector within the text vectors that is to be associated with an input field (block 608). Generating the text vectors in block 606, for instance, may involve utilizing LSTM cells to generate text vectors that capture semantic meaning of the text features as described in relation to FIG. 3.

Locating the text vector in block 608 includes processing the text vectors to identify text vectors likely to be associated with widgets. This may involve, for instance, filtering out text features that are identified as corresponding to static text and/or inline captions. As described above with respect to FIG. 4, the text vectors may be fed into a neural network that can establish semantic meaning of the text vector to determine whether the text vector corresponds to static text or a caption. Further as described above with respect to FIG. 4, bounding boxes corresponding to text features may be compared to bounding boxes of potential widgets to identify inline captions with significant bounding box overlap. The text vectors are thus processed to remove any text vectors that are unlikely to be associated with widgets, such as text vectors associated with static text or inline captions.

Each respective caption text is associated with a single bounding box (block 610). This may include, for instance, filtering the bounding boxes to identify a subset of bounding boxes in proximity to the respective caption text that are most likely to be associated with the respective caption text, thus reducing the dataset and increasing the efficiency of further processing. In some embodiments, the filtering includes performing a directional neighbor search to identify a number of bounding boxes in each direction from the caption text as described with respect to FIG. 5. The bounding boxes and the caption text are input into a neural network to identify a relationship between a single bounding box and the caption, and a structured association is created between the caption text and the single bounding box. A digital document is generated that incorporates an interactive widgets corresponding to the associated caption text (block 612). The interactive widget uses the structured association to allow user interaction with the caption text via an interactive digital input field associated with the interactive widget. For instance, a user input to the interactive widget can be received and in response the digital document is altered to incorporate information based on the user input.

Figure 7:
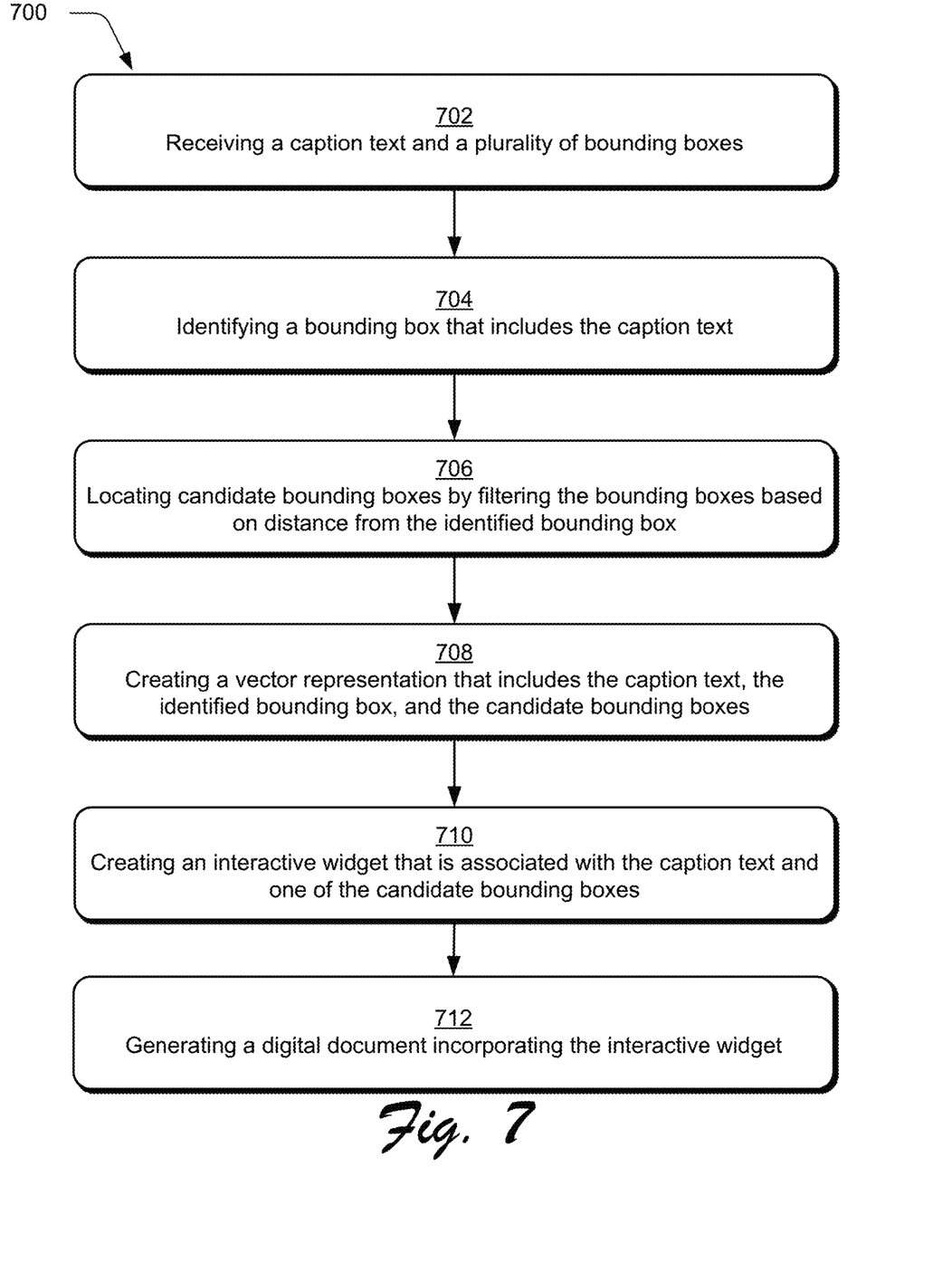
FIG. 7 is a flow diagram depicting a procedure in an example implementation of caption association for an input image.

FIG. 7 depicts a procedure 700 in an example implementation of caption association for an input image. A caption text and a plurality of bounding boxes are received (block 702). For instance, OCR or other processing techniques may have been utilized to extract the caption text and bounding boxes from the input image. A bounding box is identified that includes the caption text (block 704). Candidate bounding boxes are located by filtering the bounding boxes based on distance from the identified bounding box (block 706). For instance, search spaces are reduced based on an assumption that an associated widget is likely to be found in proximity to the caption text, and a neighborhood search is performed to identify potential widgets in proximity to the caption text. A vector representation is created that includes the caption text, the identified bounding box, and the candidate bounding boxes (block 708). This may include utilizing a language model as described with respect to FIG. 2. An interactive widget is created that is associated with the caption text and one of the candidate bounding boxes (block 710). For instance, the interactive widget may be an interactive text field, an interactive toggle, a drop-down menu, and so forth. A digital document is generated that incorporates the interactive widget (block 712).

Having discussed some example procedures, consider now a discussion of an example system and device in accordance with one or more implementations.

Example System and Device

Figure 8:
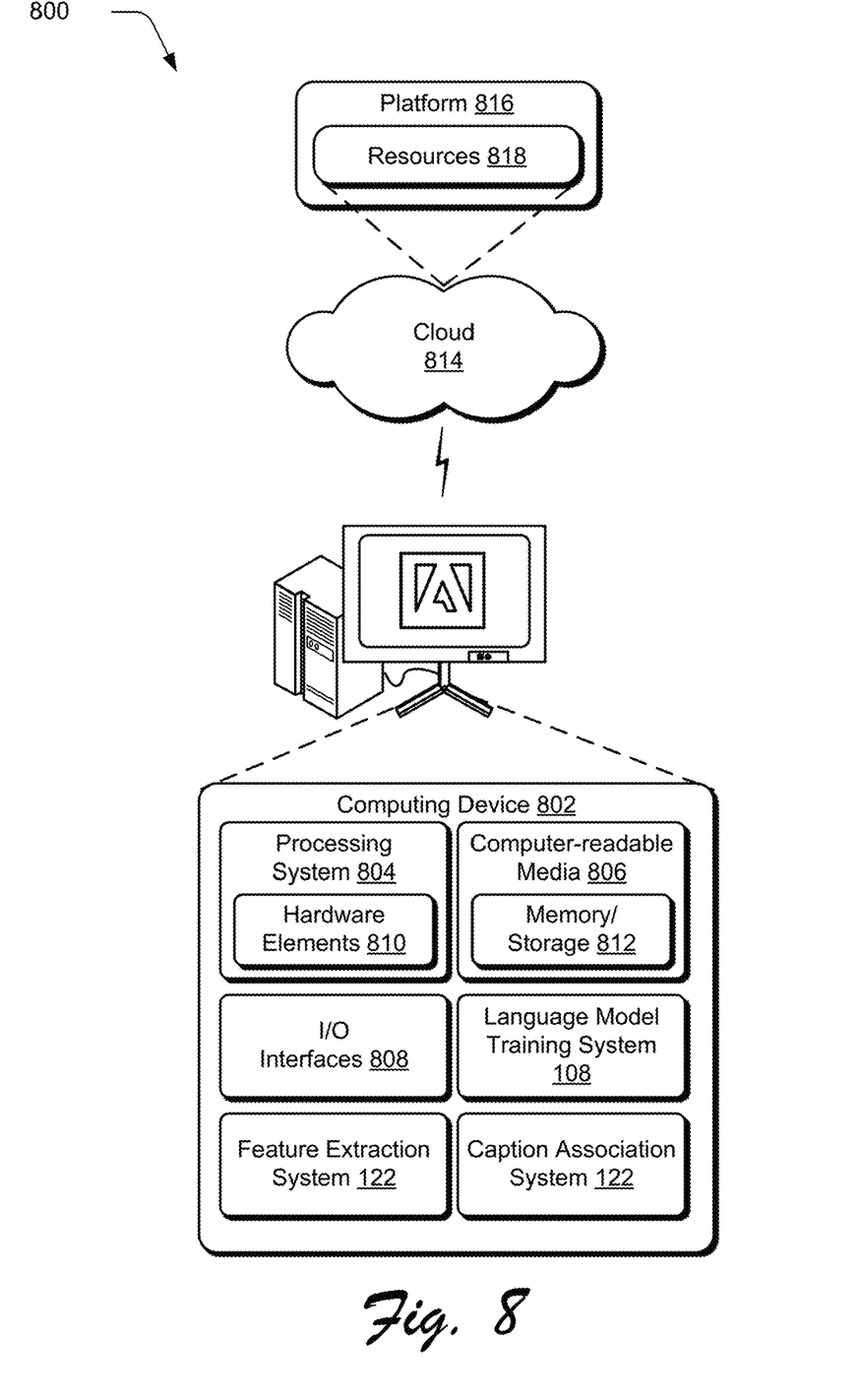
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the language model training system 104, the feature extraction system 112, and the caption association system 116. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium caption environment, a method implemented by a computing device, the method comprising:
   extracting, by the computing device, text features and feature bounding boxes from an input image;
   generating, by the computing device, multi-dimensional text vectors by transforming the text features using a language model as capturing semantic meaning of the text features, respectively;
   identifying, by the computing device, a caption text by locating a text vector from the multi-dimensional text vectors for association with an input field, the identifying based on the semantic meaning of the text feature described by the text vector;
   generating, by the computing device, candidate feature bounding boxes by filtering the feature bounding boxes based on a distance between the caption text and the feature bounding boxes, respectively;
   generating, by the computing device, a concatenated vector that includes the text vector of the caption text, a text bounding box from the text bounding boxes that includes the caption text, and the candidate feature bounding boxes;
   identifying, by the computing device, an input field bounding box by determining which of the candidate feature bounding boxes corresponds to the input field by processing the concatenated vector using a neural network;
   creating, by the computing device, a structured association between the caption text and the input field bounding box based on the identifying; and
   generating, by the computing device, a digital document incorporating the input field as corresponding to the input field bounding box as using the structured association to support user interaction with the caption text.

2. The method of claim 1, wherein the language model is trained from a text corpus that is a general text corpus not directly including text drawn from the input image.

3. The method of claim 1, wherein the identifying the caption text further includes filtering, prior to the locating, the text vectors with a different neural network to remove static texts that are not associated with input fields based on the semantic meaning of the static texts according to the corresponding text vectors.

4. The method of claim 1, wherein the identifying the caption text further includes filtering, prior to the locating, the text vectors to remove in-line captions that are not associated with input fields by comparing a text bounding box associated with the caption text with a plurality of the feature bounding boxes.

5. The method of claim 1, wherein the identifying the caption text further includes filtering, prior to the locating, the text vectors to remove static texts and in-line captions that are not associated with input fields.

6. The method of claim 1, wherein the generating of the candidate feature bounding boxes is based on a neighborhood search around a text bounding box corresponding to the caption text and the feature bounding boxes.

7. The method of claim 6, wherein the identifying the input field bounding box by the neural network includes identifying a relationship between the input field bounding box and the caption text.

8. The method of claim 1, wherein the language model is trained from a text corpus that includes a general text corpus modified to include one or more mutations, and wherein the text vectors include information pertaining to a semantic meaning of the text features.

9. In a digital medium caption environment, at least one computer-readable medium storing processor-executable instructions that, responsive to execution by a processing system, cause the processing system to perform operations comprising:
   receiving text features, text bounding boxes and feature bounding boxes extracted from an image;
   identifying a caption text extracted for the image, the caption text extracted by processing the text textures from the image and the caption text is identified based upon referencing multi-dimensional vector representations that each describe semantic meanings of the text features and locating the captioned text described by one of the vector representations;
   identifying a text bounding box from the plurality of text bounding boxes, the identified text bounding box including the caption text;
   locating candidate input field bounding boxes by filtering the feature bounding boxes based on distance to the identified text bounding box;
   creating a concatenated vector representation that includes the caption text, the identified text bounding box, and the candidate input field bounding boxes;
   creating an interactive widget that is associated with the caption text and a respective said candidate input field bounding box by providing the concatenated vector representation into a neural network to identify a particular relationship between the caption text and the respective said candidate input field bounding box from amongst the candidate field input bounding boxes; and
   generating a digital document incorporating the interactive widget supporting user interaction with the caption text via the interactive widget.

10. The at least one computer-readable medium of claim 9, wherein the filtering the feature bounding boxes includes identifying a subset of feature bounding boxes likely to be associated with the caption text by performing a directional neighbor search around the identified text bounding box.

11. The at least one computer-readable medium of claim 10, wherein the directional neighbor search includes searching for feature bounding boxes in an up direction, a down direction, a left direction, and a right direction from the text bounding box that includes the caption text.

12. The at least one computer-readable medium of claim 11, wherein the candidate input field bounding boxes include at least one feature bounding box from each of the respective said directions.

13. The at least one computer-readable medium of claim 9, wherein the caption text is identified by:
  generating the multi-dimensional text vectors by processing text features extracted from the image with a language model; and
  locating a multi-dimensional text vector within the multi-dimensional text vectors that is to be associated with an input field.

14. The at least one computer-readable medium of claim 9, wherein the interactive widget includes an editable text field.

15. The at least one computer-readable medium of claim 9, wherein the operations further include receiving a user input to the interactive widget and altering the digital document to incorporate information based on the user input.

16. The at least one computer-readable medium of claim 9, wherein the digital document is a refillable digital form.

17. At least one computing device in a digital medium caption environment, the at least one computing device comprising:
  means for generating multi-dimensional text vectors by processing text features extracted from an input image using a language model, the multi-dimensional text vectors capturing semantic meaning of the text features;
  means for identifying a caption text by locating a multi-dimensional text vector from the multi-dimensional text vectors for association with a widget, the identifying means based on the semantic meaning of the text feature described by the multi-dimensional text vector;
  means for generating candidate feature bounding boxes by filtering feature bounding boxes extracted from the image, the filtering based on a distance between the caption text and the feature bounding boxes, respectively;
  means for generating a concatenated vector that includes the text vector of the caption text, a text bounding box from the text bounding boxes that includes the caption text, and the candidate feature bounding boxes;
  means for identifying an input field bounding box from the candidate feature bounding boxes by determining which of the candidate feature bounding boxes corresponds to the widget by processing the concatenated vector using a neural network;
  means for generating a caption-widget pair that includes the caption text as associated with the input field bounding box of the widget, the widget is functionally interactive to accept user input; and
  means for generating a digital document incorporating the caption-widget pair.

18. The at least one computing device of claim 17, wherein the identifying caption text means includes means for identifying a plurality of feature bounding boxes in proximity to the text bounding box that includes the caption text by performing a neighborhood search around the text bounding box.

19. The at least one computing device of claim 17, further comprising means for identifying the caption text including means for identifying a plurality of static texts that are not caption texts and means for identifying a plurality of in-line captions that are not caption texts.

20. The at least one computing device of claim 17, wherein the digital document is a refillable digital form.

* * * * *